Figure 1:
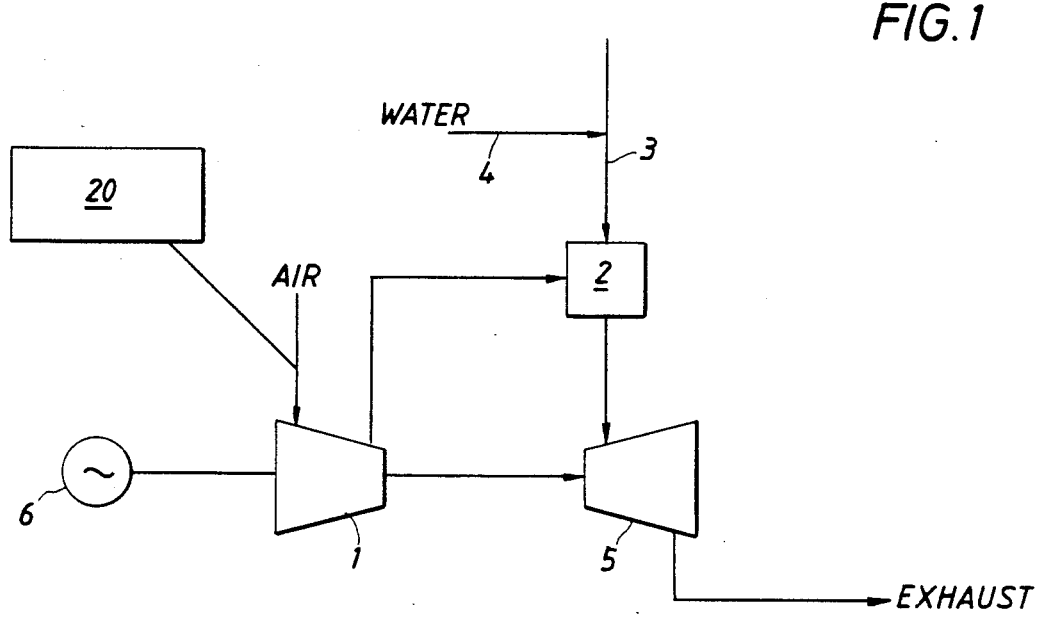

United States Patent [19]
Phillips et al.

[11] Patent Number: 5,163,282
[45] Date of Patent: Nov. 17, 1992

[54] TURBINE PROCESS

[75] Inventors: Jeffrey N. Phillips; Mark M. Friedman, both of Houston, Tex.

[73] Assignee: Shell Oil Company, Houston, Tex.

[21] Appl. No.: 732,877

[22] Filed: Jul. 19, 1991

[51] Int. Cl.[5] .............................. F02C 7/00; F02C 9/16
[52] U.S. Cl. .................................... 60/39.05; 60/39.29
[58] Field of Search ................ 60/39.03, 39.05, 39.12, 60/39.29, 39.3, 39.55

[56] References Cited
U.S. PATENT DOCUMENTS 2,931,168  4/1960  Alexander et al. ............... 60/39.29
4,275,557  6/1981  Marvin et al. ..................... 60/39.03

OTHER PUBLICATIONS

*The Aircraft Gas Turbine Engine and Its Operation* Pratt & Whitney Aircraft Group, 1974, pp. 133-134, 190.

Primary Examiner—Louis J. Casaregola

[57] ABSTRACT

A process for maintaining or increasing the power output of a gas turbine is described in which the ambient temperature in the locus of the gas turbine is monitored. In response to an increase in ambient temperature above the design temperature of the turbine the air volumetric flow rate through the compressor is increased and water is added to the combustion chamber in an amount sufficient to increase the volumetric flow rate of the gases through the expander section to the volumetric flow rate limit of the section.

1 Claim, 1 Drawing Sheet

TURBINE PROCESS

BACKGROUND OF THE INVENTION

A major anticipated application for coal gasification technology in the long term is the production of fuel gas suitable for use in the generation of electricity. In one scenario, power generation plants currently being planned or planned for retrofit will be equipped to run on natural gas until the price of the coal gasification product (called synthesis gas) is competitive therewith, at which time the switchover to synthesis gas will be made. However, in any system designed to utilize natural gas, inefficiency will occur in the switchover because, among other reasons, synthesis gas has only about one-third the calorific value of natural gas.

In such plants, electricity would be generated by use of a combined cycle system which comprises a gas turbine, a heat recovery steam generator, and a steam turbine. In the combined cycle system, the fuel is combusted in the turbine to generate electricity directly, and heat is recovered from the exhaust to raise steam which drives the steam turbine.

A typical gas turbine will comprise an air compressor, a combustion chamber, and an expander section. Since, as mentioned, synthesis gas supplies only about one-third the heat value of natural gas, the volume of fuel required to feed the gas turbine will be about three times as large the volume of natural gas utilized. However, the compressor and expander section of the turbine have a maximum volumetric flow rate which they can pass. Since the total flow through the expander section is thus limited, it will be necessary to reduce the air flow rate when synthesis gas is utilized. As those skilled in the art will recognize, this results in underutilization of the compressor.

Again, the compressor can accept a larger air mass flow rate in the winter than in the summer (the density of the expander flow is not affected by ambient temperature since the combustion temperature is held constant and the expander volumetric flow rate is thus directly proportional to its mass flow rate). The result is that the expander section is underutilized at ambient temperatures above design. Stated differently, the gas turbine suffers a derating at higher ambient temperatures.

The invention is directed to overcoming these drawbacks, and is further directed to maintaining or increasing the power of a gas turbine without sacrificing efficiency.

SUMMARY OF THE INVENTION

Accordingly, in one embodiment, the invention relates to a process for maintaining or increasing the power output of a gas turbine, the gas turbine comprising an air compressor, a combustion chamber, and an expander section, in which turbine fuel is combusted in the combustion chamber with air fed from the compressor and the hot combustion gases are utilized in the expander section. According to the invention, the ambient temperature in the locus of the gas turbine is monitored, and, in response to an increase in ambient temperature from the design temperature, the air flow rate through the compressor is increased. After the volumetric flow rate limit of the compressor is reached (or before, if desired) water is added to the combustion chamber in an amount sufficient to increase the volumetric flow rate of the gases through the expander section to reach the volumetric flow rate limit of the section. The invention thus relates to a process of the type described comprising monitoring the ambient temperature in the locus of the gas turbine; increasing the air volumetric flow rate through the compressor in response to an increase in ambient temperature above the design temperature of the turbine; and, after the volumetric flow rate limit of the compressor is reached (or before, if desired) adding water to the combustion chamber in an amount sufficient to increase the volumetric flow rate of the gases through the expander section to the volumetric flow rate limit of the section. As indicated, supra, the water may be added prior to, concurrently with, or after the air volumetric flow rate limit of the compressor is reached. As used herein, the term "water" is taken to include liquid water as well as steam, while the phrase "design temperature of the turbine" refers to the ambient temperature assumed by the designer when sizing the turbine components. In a typical case, the design temperature of the turbine will be in the range of from 0° C. to 15° C. Further, the term "amount sufficient to increase the volumetric flow rate of the gases through the expander section to the volumetric flow rate limit of the section" is to be understood to require more than insignificant amounts of water, particularly amounts more than that which may be added to limit $NO_x$ formation in the combustion gas. In general, the amount of water added will be from about 2 percent to about 10 percent by weight of the gas passing through the expander section. As will be evident to those skilled in the art, the process of the invention allows the operation of a gas turbine, and combined cycle including a steam turbine, at or near a constant power output level year round. Again, the invention allows the achievement of constant power output without exacting a severe efficiency penalty.

In order to describe the invention more fully, the following illustration is given, with reference to the accompanying schematic drawing.

Figure 2:
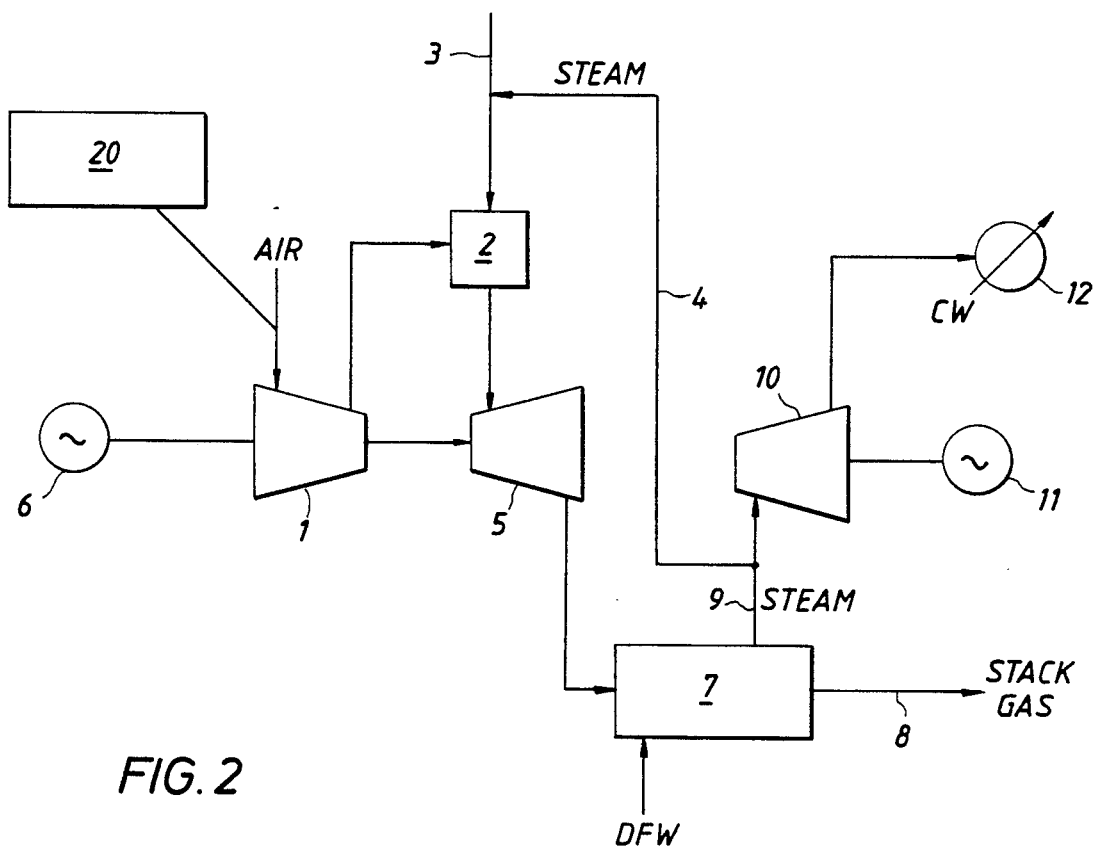

FIG. 1 illustrates the process of the invention in the context of a simple gas turbine cycle, while FIG. 2 illustrates its usage in a combined cycle. All values are calculated or illustrative.

For brevity, the invention will be demonstrated by discussion with reference principally to FIG. 2, although those skilled in the art will recognize that the invention is fully applicable to the simple turbine cycle of FIG. 1. For simplicity, common numbers are utilized to indicate identical or corresponding equipment or elements.

Accordingly, air at 4° C. is fed to and compressed in compressor 1 and thence passed to combustion chamber 2 where fuel from line 3 is combusted. A small amount of steam (for $NO_x$ control) is added via line 4 to the fuel before combustion, and the gases are expanded through the expander section of turbine 5. Turbine 5 drives compressor 1 and generator 6. Gases from turbine 5 flow to heat recovery steam generator 7 where steam is generated, normally by indirect heat exchange. The combustion gases are then exhausted via line 8 to purification and/or waste. The bulk of the steam from 7 is then passed through line 9 to and through steam turbine 10, which drives generator 11 to produce additional power. The spent steam is then condensed in condenser 12. A portion of the steam is bled via line 4 for use as described, supra. The simple turbine cycle of FIG. 1, of course, does not encompass elements 7 through 11, and liquid water may be used instead of steam. In both cases, an inlet air temperature monitor 20 is employed, as described more fully hereinafter.

In this illustration, the gas turbine is designed to receive flow from a compressor having a flow limit of 75.9 m³/s at standard atmospheric pressure. The expander of the turbine has a flow limit of 30.9 m³/s (100 kg/s) at the design combustor outlet conditions of 14 atmospheres pressure and 1260° C.

In normal practice, when using natural gas as the fuel, 0.43 kg/s of steam is added, as indicated, at the combustor for every 1.0 kg/s of fuel consumed in order to control $NO_x$ emissions to a permissible level. In this illustration, the gas turbine components have been sized such that at a temperature of 4° C. the sum of the maximum air flow through the compressor (75.9 m³/s) and the required flows of natural gas and steam exactly matches the flow limit of the expander, as shown in Table 1 below. At the hotter ambient temperatures indicated in Table 1, the volumetric air flow through the compressor remains constant, but the mass flow decreases as does the mass flow through the expander. As a consequence the power output of the combined cycle decreases. As the ambient temperature rises from 4° C. to 38° C., the power output decreases by 17%.

TABLE 1

| Ambient Temp. (°C.) | Air Flow (m³/s) | Air Flow (kg/s) | Fuel Flow (kg/s) | Steam Flow (kg/s) | Expander Flow (kg/s) | Relative Power (%) |
|---|---|---|---|---|---|---|
| 4 | 75.9 | 97.0 | 2.10 | 0.9 | 100.0 | 100 |
| 16 | 75.9 | 93.3 | 2.02 | 0.9 | 96.2 | 94 |
| 29 | 75.9 | 89.1 | 1.93 | 0.8 | 91.8 | 87 |
| 38 | 75.9 | 86.6 | 1.87 | 0.8 | 89.3 | 83 |

If the gas turbine consumes synthesis gas ($CO+H_2$), 0.39 kg/s of steam must be added at the combustor to control $NO_x$ emissions for every 1.0 kg/s of fuel consumed. With reference to Table 2 hereinafter, at an ambient temperature of 4° C., in order to accommodate 7.9 kg/s of synthesis gas and 3.1 kg/s of steam, the compressor throughput must be controlled to 69.5 m³/s (89.0 kg/s) by partially closing off the compressor's inlet guide vanes. Under these conditions the flow through the expander is at the limit of 100 kg/s. If the conventional approach is followed, the volumetric air flow through the compressor will remain constant as ambient temperature increases, and the power output of the combined cycle will decrease as it would with natural gas as the fuel.

TABLE 2

| Ambient Temp. (°C.) | Air Flow (m³/s) | Air Flow (kg/s) | Fuel Flow (kg/s) | Steam Flow (kg/s) | Expander Flow (kg/s) | Relative Power (%) |
|---|---|---|---|---|---|---|
| 4 | 69.5 | 89.0 | 7.9 | 3.1 | 100.0 | 100 |
| 16 | 69.5 | 85.6 | 7.6 | 3.0 | 96.2 | 94 |
| 29 | 69.5 | 81.8 | 7.3 | 2.9 | 92.0 | 87 |
| 38 | 69.5 | 79.5 | 7.0 | 2.8 | 89.3 | 83 |

According to the invention, and with reference to Table 3, the ambient temperature is monitored by a suitably positioned temperature monitor, e.g., a thermometer. The gas turbine is fired on synthesis gas. At 4° C. ambient temperature, combined cycle performance it identical to that described above for synthesis gas operation at 4° C. However, if the ambient temperature rises above 4° C. the compressor volumetric flow is first increased by an amount necessary to maintain constant mass flow through the compressor. Volumetric flow is increased by more fully opening the inlet guide vanes of compressor 1 which were partially closed in order to accommodate the synthesis gas. Fuel flow, steam flow for $NO_x$ control, and expander mass flow rates also remain constant. However, if the ambient temperature rises above 29° C., air volumetric flow cannot be increased, as the volumetric flow is at the compressor's limit. As a result, mass flow through the compressor will decrease, but may be compensated for according to the invention by an appropriate increase in steam and fuel flow to the combustor. Thus, at an ambient temperature of 38° C., the air flow is 75.9 m³/s (86.6 kg/s), the fuel flow is 8.2 kg/s, the steam flow is 5.2 kg/s, and the expander flow is at its limit.

TABLE 3

| Ambient Temp. (°C.) | Air Flow (m³/s) | Air Flow (kg/s) | Fuel Flow (kg/s) | Steam Flow (kg/s) | Expander Flow (kg/s) | Relative Power (%) |
|---|---|---|---|---|---|---|
| 4 | 69.5 | 89.0 | 7.9 | 3.1 | 100.0 | 100 |
| 16 | 72.4 | 89.0 | 7.9 | 3.1 | 100.0 | 98 |
| 29 | 75.9 | 89.0 | 7.9 | 3.1 | 100.0 | 97 |
| 38 | 75.9 | 86.6 | 8.2 | 5.2 | 100.0 | 98 |

It may be calculated that, utilizing the invention, the power output of the combined cycle at 38° C. will be only 2% less than the output at 4° C. In addition, the power output is more than 18% greater than it would be if the current practice of maintaining compressor volumetric flow at a constant value was followed.

Additionally, it should be noted that, for each of the cases discussed above, if the ambient temperature dropped below 4° C., either the volumetric flow of air through the compressor would have to be decreased in order to avoid exceeding the flow limit of the expander, or the combustor outlet temperature would have to be decreased (by reducing the fuel/air ratio). In the latter approach, the mass flow limit of the expander would thereby be increased.

What is claimed is:

1. A process comprising compressing air in the compressor of a gas turbine, combusting synthesis gas with the compressed air in the combustion chamber of the turbine to produce hot combustion gas, expanding the combustion gas in the expander section of the turbine, and generating electricity, monitoring the ambient temperature in the locus of the gas turbine; increasing the air volumetric flow rate through the compressor in response to an increase in ambient temperature above the design temperature of the turbine; and adding water to the combustion chamber in an amount sufficient to increase the volumetric flow rate of the gases through the expander section to the volumetric flow rate limit of the section.

* * * * *